United States Patent
Johnston et al.

(10) Patent No.: US 10,353,531 B2
(45) Date of Patent: Jul. 16, 2019

(54) SYSTEM AND METHOD FOR BUILDING CUSTOMIZED WEB APPLICATIONS WITHIN A DOMAIN

(71) Applicant: Conduent Business Services, LLC, Dallas, TX (US)

(72) Inventors: Terry Michael Johnston, Palm Bay, FL (US); Chad Matthew Ramos, Chicago, IL (US); Jeff Michael Couturier, Viera, FL (US)

(73) Assignee: Conduent Business Services, LLC, Florham Park, NJ (US)

( * ) Notice: Subject to any disclaimer, the term of this patent is extended or adjusted under 35 U.S.C. 154(b) by 197 days.

(21) Appl. No.: 15/606,342

(22) Filed: May 26, 2017

(65) Prior Publication Data
US 2018/0341369 A1    Nov. 29, 2018

(51) Int. Cl.
| | |
|---|---|
| *G06F 3/048* | (2013.01) |
| *G06F 3/0481* | (2013.01) |
| *G06F 16/958* | (2019.01) |
| *G06F 16/22* | (2019.01) |

(52) U.S. Cl.
CPC ........ *G06F 3/0481* (2013.01); *G06F 16/2228* (2019.01); *G06F 16/958* (2019.01)

(58) Field of Classification Search
None
See application file for complete search history.

(56) References Cited

U.S. PATENT DOCUMENTS

| | | | | |
|---|---|---|---|---|
| 9,053,146 B1* | 6/2015 | Kapoor | ................. | G06F 16/242 |
| 9,207,703 B1* | 12/2015 | Kancharla | ................. | G06F 1/00 |
| 9,633,378 B1* | 4/2017 | Nath | ................. | G06Q 30/0277 |
| 2002/0152244 A1* | 10/2002 | Dean | ................. | G06F 17/2247 |
| | | | | 715/255 |
| 2004/0064501 A1* | 4/2004 | Jan | ................. | H04L 29/12066 |
| | | | | 709/203 |
| 2004/0073404 A1* | 4/2004 | Brooks | ................. | G05B 19/409 |
| | | | | 702/183 |
| 2004/0153509 A1* | 8/2004 | Alcorn | ................. | G06Q 30/06 |
| | | | | 709/205 |
| 2005/0216555 A1* | 9/2005 | English | ................. | G06Q 50/18 |
| | | | | 709/204 |
| 2007/0208751 A1* | 9/2007 | Cowan | ................. | G06Q 10/10 |
| 2008/0189303 A1* | 8/2008 | Bush | ................. | G06F 16/958 |
| 2009/0083633 A1* | 3/2009 | Toner | ................. | G06Q 30/06 |
| | | | | 715/733 |
| 2010/0293448 A1* | 11/2010 | Rand | ................. | G06F 16/9537 |
| | | | | 715/206 |
| 2011/0161479 A1* | 6/2011 | Freishtat | ................. | G06Q 30/02 |
| | | | | 709/223 |

(Continued)

*Primary Examiner* — Hua Lu
(74) *Attorney, Agent, or Firm* — Fay Sharpe LLP

(57) ABSTRACT

A computer-implemented method and system enable customizing web applications within a domain includes mapping a plurality of source databases to a universal database. A webpage is generated, which includes providing for a user to incorporate at least one widget into a webpage, associating a call to the universal database for the incorporated at least one widget. The webpage, or a model of the webpage, is incorporated into a management system. When the widget is actuated, a visualization of data from at least one of the plurality of source databases that has been mapped to the universal database is incorporated into the webpage.

22 Claims, 11 Drawing Sheets

(56) References Cited

U.S. PATENT DOCUMENTS

| | | | |
|---|---|---|---|
| 2012/0066585 A1* | 3/2012 | Caceres | G06F 17/218 715/235 |
| 2012/0144327 A1* | 6/2012 | Johnson | G06F 3/0486 715/763 |
| 2013/0151950 A1* | 6/2013 | McEvilly | G06F 16/9537 715/234 |
| 2014/0122993 A1* | 5/2014 | Calvin | A61B 17/8833 715/234 |
| 2015/0007064 A1* | 1/2015 | Givoni | G06F 16/958 715/760 |
| 2015/0019991 A1* | 1/2015 | Kristj Nsson | H04L 41/0853 715/747 |
| 2015/0058310 A1* | 2/2015 | Mukherjee | G06Q 30/02 707/706 |
| 2015/0067819 A1* | 3/2015 | Shribman | H04L 67/06 726/12 |
| 2015/0161649 A1* | 6/2015 | Eggleston | G06Q 30/0631 705/14.36 |
| 2017/0076336 A1* | 3/2017 | Maynard | G06Q 30/0276 |
| 2017/0139659 A1* | 5/2017 | Spriggs | G06F 3/1407 |
| 2017/0185612 A1* | 6/2017 | Kamadolli | G06F 3/04842 |
| 2017/0344656 A1* | 11/2017 | Koren | G06F 16/958 |

\* cited by examiner

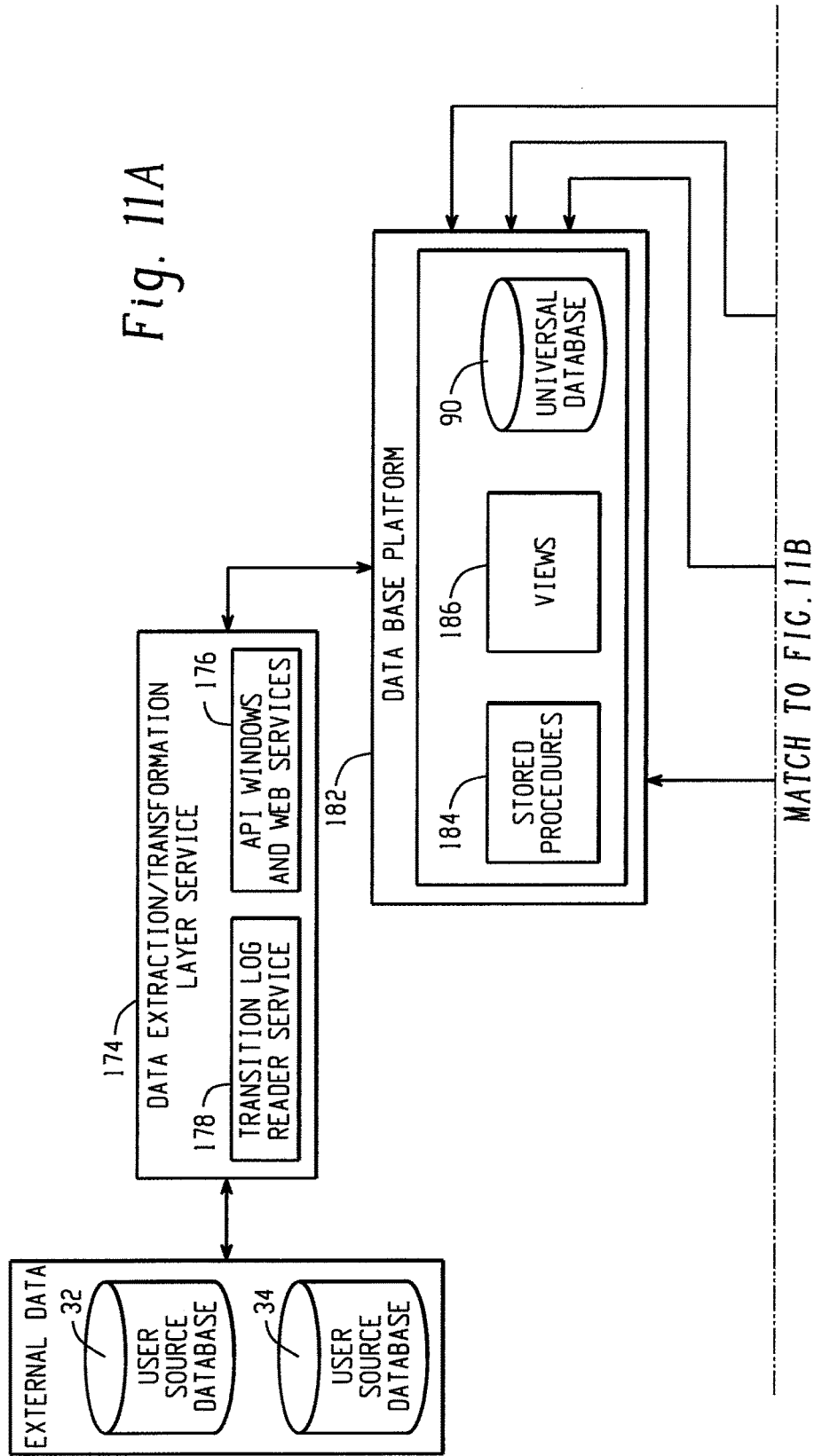

SYSTEM AND METHOD FOR BUILDING CUSTOMIZED WEB APPLICATIONS WITHIN A DOMAIN

BACKGROUND

This application relates in general to generating graphical displays of information derived from different sources, and in particular to a system and method for customizing web applications within a domain.

Organizations, including businesses, public sector groups, and agencies, often utilize unique management systems that are customized to manage business or services performed by that organization. In general, management systems assist an organization in tracking data, information, employees, and other factors associated with the business of the organization. Each management system can be specific to the organization, including specific databases used, deployed communication technologies, infrastructure for sensing and acting on information entered, business rules, and vocabulary, as well as other elements that differ between organizations. For example, retail stores and online stores generally have different needs and business rules that are reflected in the unique systems. Further, franchise businesses may use different management systems for each different location or owner, despite the shared type of business method and model.

Unfortunately, attempts to collect data across different organizations utilizing different management systems can be difficult and extremely time consuming. Generally, each organization must provide the data, which may be in different formats, and then the data can be manually entered into a single program for further analysis. In some cases, related organizations attempt to impose a standard information technology ecosystem by bundling all required components into a standalone software package that can be installed by each related organization.

Related organizations that utilize a universal management system, however, experience challenges. Often, a universal system fails to address individual organization needs, which can vary significantly among employees and customers in different locations. For example, an entity with multiple organizations that each use a universal system may find that the universal system fails to fit or adequately address of the needs of one or more of the organizations. One solution currently is to build customized software for each. However, such a customized system makes accessing and processing data across the related organizations difficult. Some of the customization can be reused for related organizations, but new vocabularies and business rules need to be incorporated for each organization, which can still be costly.

Therefore, there is a need for a system and method for developing customized web applications across related organizations in a business domain.

BRIEF DESCRIPTION

In accordance with one aspect of the exemplary embodiment, a computer-implemented method for customizing web applications within a domain includes mapping a plurality of source databases to a universal database. A webpage is generated, which includes providing for a user to incorporate at least one widget into a webpage, associating a call to the universal database for the incorporated at least one widget, such that when the widget is actuated, a visualization of data from at least one of the plurality of source databases that has been mapped to the universal database is incorporated into the webpage. The webpage, or a model of the webpage, is incorporated into a management system.

At least one of the mapping, associating, and incorporating may be performed with a processor.

In accordance with another aspect of the exemplary embodiment, a system is provided for customizing web applications within a domain. The system includes a universal database to which a plurality of source databases are mapped. A page builder generates a webpage. The page builder provides for a user to incorporate at least one widget into a webpage, and associates a call to the universal database for retrieving data corresponding to the incorporated at least one widget. A data manipulation component, for at least one of the actuated widgets, manipulates the retrieved data for incorporation into the webpage. A processor implements the page builder and the data manipulation component.

In accordance with another aspect of the exemplary embodiment, a computer-implemented method for customizing web applications within a domain, includes generating a webpage, including providing for a user to incorporate at least one widget into a webpage, and, for the incorporated at least one widget, associating a call to a universal database to which a plurality of source databases are mapped, incorporating the webpage or a model thereof into a management system, and providing for the widget to be actuated. When the widget is actuated, the method includes making the call to the universal database and incorporating data from at least one of the plurality of source databases that has been mapped to the universal database into the webpage.

At least one of the mapping, associating, and incorporating is performed with a processor.

DETAILED DESCRIPTION

Aspects of the exemplary embodiment relate to a system and method for customizing web applications within a domain.

The system and method address the problem of variability of management systems across related organizations, due to, for example, variations in data collected and metrics measured. By reducing the variability of independent systems, while maintaining customization for each of the different organizations, a system of independent systems can be generated. Each of the independent systems is able to feed into a common system by utilizing a set of universal, configurable widgets that allow each related organization to customize their management system, but maintain consistency with respect to how data is accessed and output.

The present system and method find particular application in connection with a set of related organizations which share internal data. The related organizations may be branches or divisions of a hierarchical entity, a set of franchisees having a common franchisor, a loose association of organizations, or otherwise related. Each of the related organizations may have access to a respective management system for storing, collecting, and processing data. The individual management systems are linked by a common structure to make data collection and analysis across systems faster and more convenient. Such a system of independent systems allows each related organization to maintain customization of their system, while facilitating data collection across the related organizations.

Figure 1:
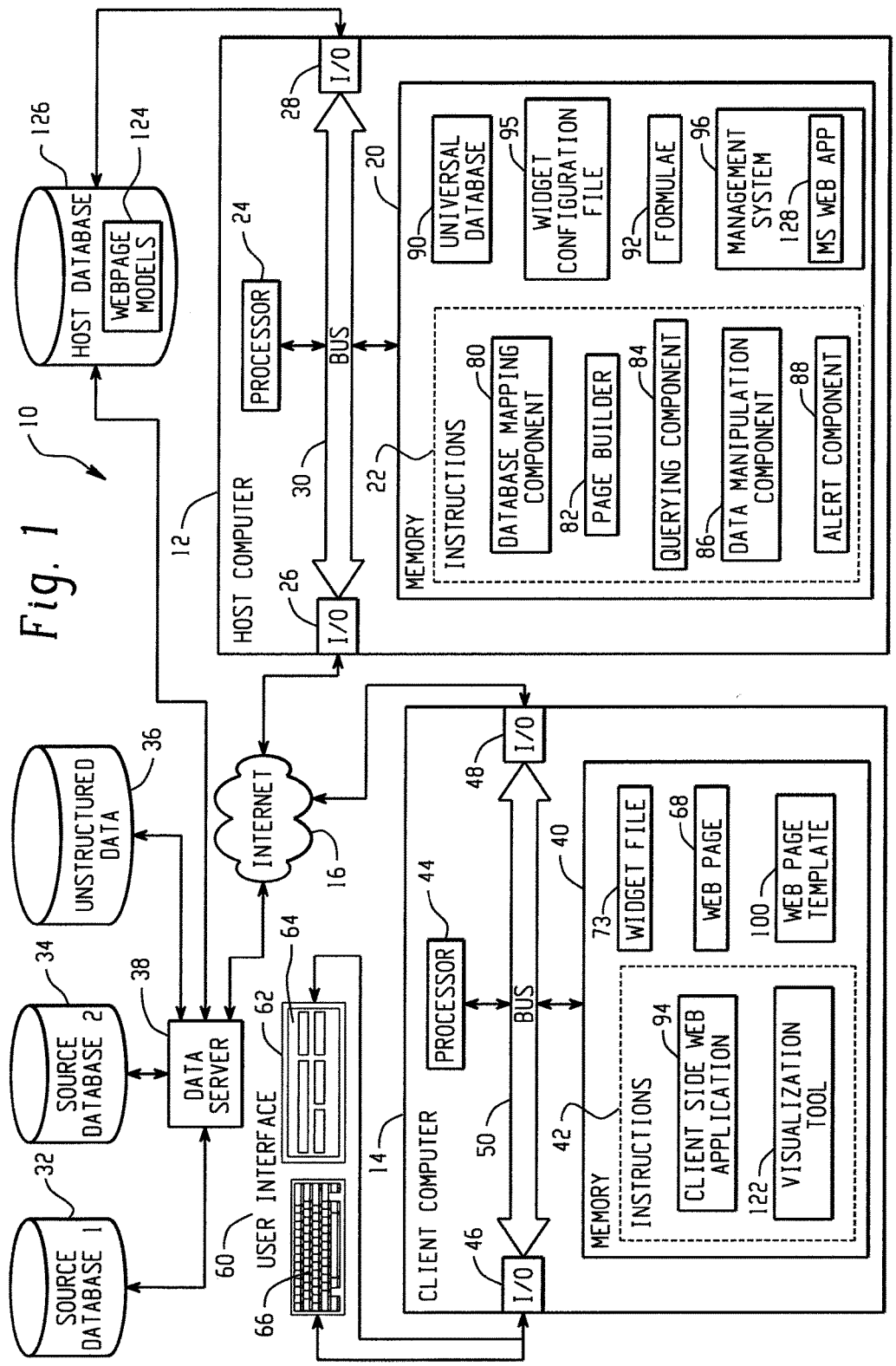
FIG. 1 is a functional block diagram of a system for customizing web applications within a domain, in accordance with one aspect of the exemplary embodiment.

FIG. 1 illustrated a computer-implemented networked system 10 for customizing web applications within a domain. The illustrated network includes a host computer 12, which is linked to a plurality of client computing devices, such as device 14, via wired or wireless links, such as a local area network or a wide area network, such as the Internet 16. The illustrated host computer 12 includes memory 20, which stores instructions 22 for performing the exemplary method, and a processor 24, in communication with the memory 20, which executes the instructions. In particular, the processor 24 executes instructions for performing the method outlined in FIG. 2. The processor may also control the overall operation of the host computer 12 by execution of processing instructions which are stored in memory 20. Host computer 12 includes one or more input/output interfaces 26, 28 for communicating with external devices. The various hardware components 20, 24, 26, 28 of the host computer 12 may be all connected by a data/control bus 30. The host computer 12 has access to a set of data sources including databases 32, 34, etc., containing structured data. The databases may be generated and/or maintained by different organizations. Thus, each, or at least some, of the structured databases, may have a different schema for organizing the data contained in the respective database(s). The host computer 12 may additionally have access to one or more unstructured databases 36, which store unstructured data, such as images, video, sound recordings, etc. The data sources 32, 34, 36, etc., may be stored on different remote servers which are accessed through a data server 38. The client device 14 need have no direct link to some or all of the data sources 32, 34, 36 nor any knowledge as to how the databases are structured.

Each client device 14 includes memory 40, which stores instructions 42 for performing part of the exemplary method, and a processor 44, in communication with the memory 40, which executes the instructions. Client computer 14 includes one or more input/output interfaces 46, 48 for communicating with external devices. The various hardware components 40, 44, 46, 48 of the client computer 14 may be all connected by a data/control bus 50. The client computer 14 may have access to one or more of the source databases 32, 34, 36 which is used to store the data for the relevant organization.

Each client device 14 may be associated with a user interface 60. The user interface may include one or more of a display device 62, for displaying information to users, such as via a graphical user interface 64, and a user input device 66, for inputting text and for communicating user input information and command selections to the processor. The user input device 66 may include one or more of a keyboard, keypad, touch screen, writable screen, and a cursor control device, such as mouse, trackball, or the like.

The host computer 12 and each client device 14 cooperate to enable a user of the client device to create a visualization, e.g., in the form of a webpage 68 (FIG. 3) which displays information extracted from data or derived from data stored in the various data sources 32, 34, 36, or selected combinations thereof, without the need for the user to have an API to access the data or any understanding of the different database schema. As illustrated in FIG. 4, the host computer 12 provides the user with simple tools, referred to as "widgets" 70 for defining the content of the webpage 68. Each widget includes a graphical representation 72 of data displayed on a display device 62 and an associated widget file 73 stored in memory which generates the graphical representation 72. The host computer 12 recognizes each of the widgets as instructions to retrieve and/or manipulate data from the data sources 32, 34, 36, including the unstructured data 36, for incorporation into the webpage 68, e.g., in a graphical and/or textual form, such as a graph, chart, timeline, table, or the like presented in respective data display regions 74, 76, 78, etc., of the webpage when the widgets are actuated by a user. At least some of the widgets 70 are configurable, i.e., can be specialized by a user to control and/or filter the data that is represented in the webpage 68.

The configurable widgets may include widgets of a set of predefined types, such as predefined widgets for displaying time-related data, e.g., as timeline; widgets associated with graphing of information, e.g., in the form of a bar graph; widgets for displaying spatial information, e.g., as a two-dimensional data map; and so forth. There may be two, three, four or more predefined types of widgets. The widgets may also include an undefined type of widget for a user to define, e.g., in JavaScript.

Returning to FIG. 1, the host software instructions 22 may include a database mapping component 80, a page builder 82, a querying component 84, a data manipulation component 86, and an alert component 88. As will be appreciated from the following, some of these components may be hosted, at least in part on the client device(s) 14.

Briefly, the database mapping component 80 includes or otherwise employs tools for learning the schema used by the structured databases 32, 34. The schema can be different for each database and describes the layout of the database, such as the descriptions of each of the columns of database tables, links between tables, and so forth. Such tools learn how to connect to the database, e.g., by testing various potential connection methods, such as direct connection and Open Database Connectivity (ODBC), until a suitable connection method is found. Once the tool is connected, it reverse engineers the respective source database to the extent possible, given that the true database schema is generally not known, and then creates a model of the database. Suitable tools for learning database schema include transaction log readers.

Once the database schema have been identified, the structured databases 32, 34, etc., are mapped to a schema of a universal database 90. The mapping includes mapping fields of the source database to fields in the universal database, allowing source data to be subsequently retrieved by querying the universal database. This enables data to be retrieved from the source databases 32, 34, when the universal database 90 is queried, via links from the universal database to the source databases. Unstructured data 36 may be linked to structured data through the universal database 90 using links, such as URIs, where there is sufficient information to identify the structured and unstructured sources of data as being related. The universal database 90 serves as an index of the data in data sources 32, 34, 36, etc., allowing multiple data sources to be readily searched and data retrieved.

Figure 3:
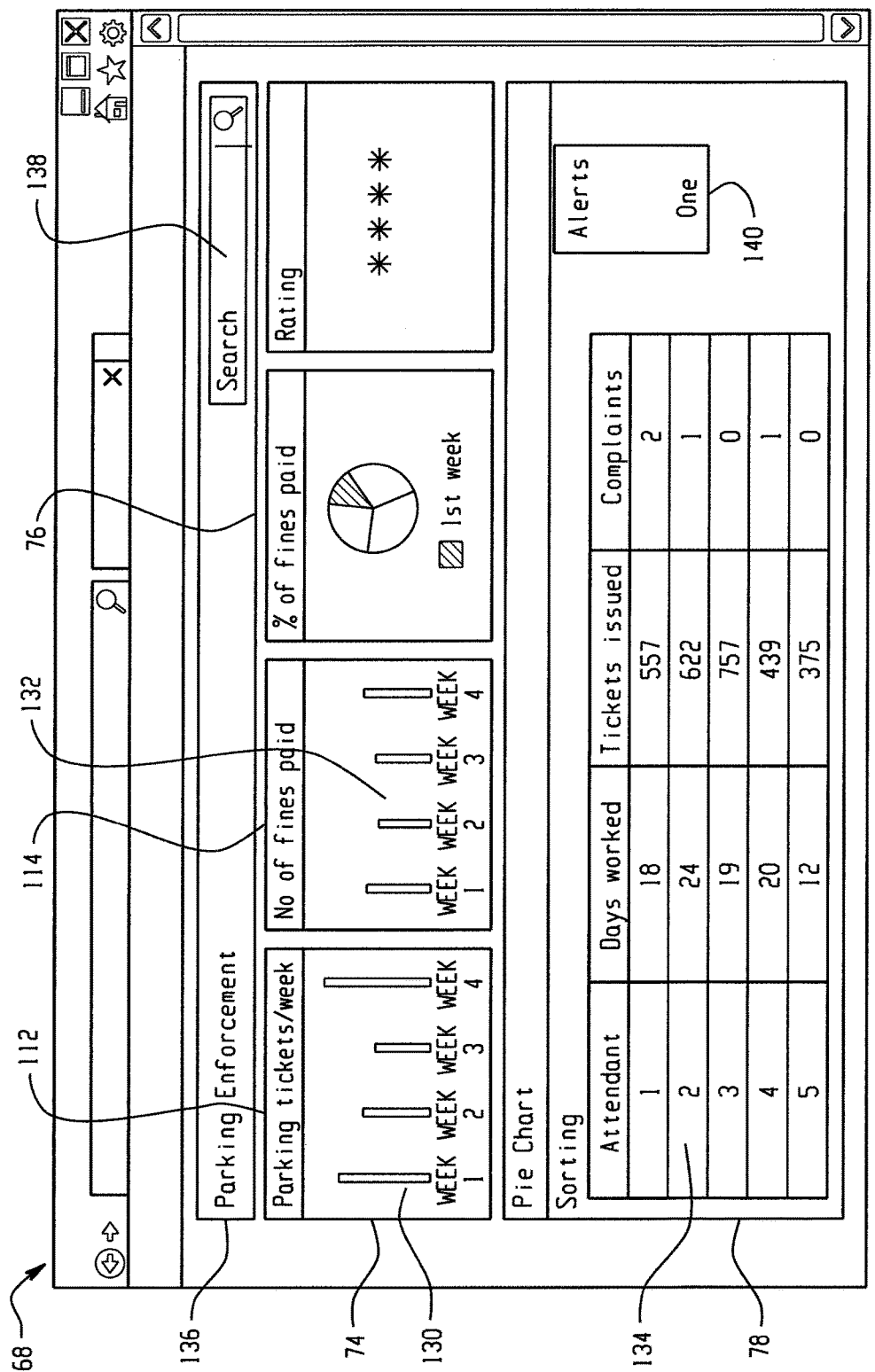
FIG. 3 shows an example webpage of a management system with visualizations of data generated with widgets.
Figure 4:
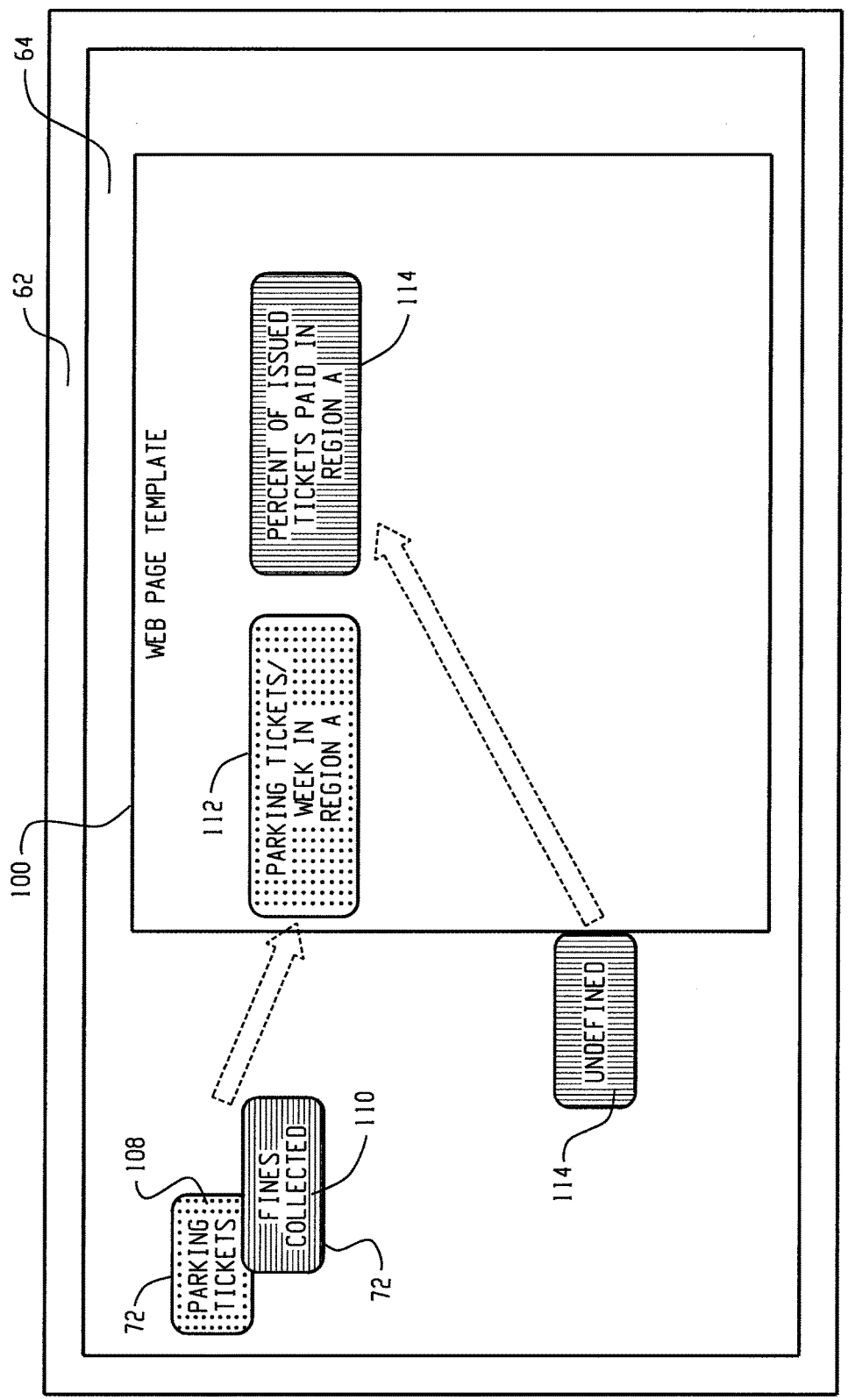
FIG. 4 graphically illustrates generating the webpage by placement of widgets.

The client device 14 communicates with the page builder 82 to provide the tools for incorporating data from the source databases, or information derived therefrom, to generate a webpage 68 (FIG. 3). A client device user, such as a representative of an organization in a particular business domain, accesses the page builder 82 through a web application 94 (client side) via the client device 14 (FIG. 1). The page builder 82 provides the client device with a widget configuration file 95, which generates the graphical widgets 72 and initializes the respective widget files 73 associated with those widgets.

In response to the actuation of one of the displayed widgets 72 in the webpage, e.g., simply by opening the webpage and/or clicking on the displayed widget, the querying component 84 queries the universal database 90 to retrieve the data to be displayed on each webpage 68, or which is to be manipulated according to a predefined formula. The data to be manipulated/displayed in the webpage may be retrieved from one or more of the linked databases 32, 34, 36.

The data manipulation component 86 enables the data in the source databases 32, 34, 36, that is retrieved by querying the universal database 90, to be manipulated to generate information useful for a given domain. For example, the data manipulation component 86 may have access to a preselected set of formulae 92 for computing different key performance indicators (KPIs). Some of the widgets 72, e.g., when specialized, or as preconfigured, may each be associated, in the associated widget file 73, with a call for a respective one of the formulae. Thus, for example, a widget could be associated with a formula for computing the number of times in a given time period that an employee has performed a task incorrectly. Each formula 92 may define the locations in the universal database 90 to be accessed for retrieving the data to perform the calculation.

The created webpage 68 can form part of a management system 96 used by the organization. The management system can include webpages for various performance indicators, depending on the type of business conducted by the organization. For example, the management system for a police agency may track offenders, violations, and charges, while the management system for an online store may track inventory, purchases, and shipping.

As illustrated in FIG. 4, the page builder 82 provides the client device 14 with a set of widgets 72 that can be selected by a user of the client device and placed into a webpage template 100 to generate a webpage 68. Each widget 72 is composed of a set of pixels on the user interface, which can be moved in response to predefined user gesture(s). The widgets 72 can be added to, removed from, written, or revised at run time, and/or during design time of the webpage. Each widget 72 includes a graphical representation 108 which may include a descriptor 110 in the form of text and/or symbols describing the data that the widget 72, when actuated, can cause to be displayed in associated regions 74, 76, 78 of the webpage. The widgets may be defined in generic terms, which can be specialized to the organization or domain by a user, as shown for widget 112. For example, the widgets can be built using a generic vocabulary and business rule taxonomy that is applicable to a particular business domain to enable the widgets to be reusable by different users within the business domain. The specialization of the widget may include adapting the descriptor 110 to the relevant organization, which may be performed automatically, according to predefined rules, and/or by the user. In one embodiment, during or subsequent to the selection and placement of the widgets, the page builder 82 converts a vocabulary and business rule taxonomy associated with each widget into a specific vocabulary and business rule taxonomy of the organization.

Some of the widgets may be undefined, allowing a user to specify a widget 114 for a new formula that has not yet been provided by the host computer.

Each displayed widget may be linked, in memory 20 and/or 40, to a native widget file 73 in a suitable language designed to store and transport data, such as HyperText Markup Language ("HTML"). The file may be independent of any software platform to allow reuse of the widgets by different users. Specifically, each widget provides a configuration for a visualization with an ability to tie data to the visualization without an understanding of the data schema of the database 32, 34, etc., from which the data is derived.

In one embodiment, the data represented in the webpage 68 includes key performance indicators (KPI) as illustrated in regions 74, 76 of the webpage shown in FIG. 3. The KPI are generally calculated data illustrating relevant performance metrics for the organization, which may be computed using formulae 92. The visualization configurations used to display such data can include one or more of a map, table, graph, timeline, or other types of data display, including configurations for displaying photographs and/or video. The widgets 72, etc., can be linked to a visualization tool 122, such as a TABLEAU or QLIK embedded application, for providing deeper visual analytics, which can be built around a call to an application programming interface (API) provided by the visualization tool.

As illustrated in FIG. 4, the user can select one or more widgets 72 for placement into a webpage by dragging and dropping each widget 72 into a desired location on the webpage template 100 (or using other predefined gestures to position the widgets on the webpage template).

The page builder 82 configures each widget in the webpage with links/calls to the querying component 84, data manipulation component 84 and/or universal database 90 for retrieving/manipulating the data to be represented in the webpage. The page builder 82 incorporates or accesses a checking system to ensure that the data calls generated are formatted correctly. Once the webpage includes the desired widgets 72 and the appropriate data calls are built, a model 124 of the webpage is generated and stored, e.g., in a host database 126 or in local memory 20, for later providing upon request. The webpage and other webpages generated are used to build a management system (server side) web application 128 for the management system 96. Authorized individuals can access the MS web application 128 to access one or more of the webpages.

When a user actuates one of the widgets 72 displayed in the webpage, the links to the universal database 90 and/or manipulation component 86 are actuated, and the respective data is retrieved and manipulated for presentation to the user in graphical and/or textual data representations 130, 132, 134 in regions 74, 76, 78. The graphical and/or textual data representations 130, 132, 134 may be shown adjacent the respective widgets 112, 114, etc. In another embodiment, the representations 130, 132, 134 may replace the widgets, e.g., be of the same size and in the same locations as the corresponding widgets 112, 114, etc. that they replace. In one embodiment, the data representations may be arranged and/or sized by the user.

In addition to the widgets and graphical and/or textual data representations, the webpage 68 may further information, such as a title 136 of the webpage and a search box 138. In the illustrated example, the user selected a first widget for displaying parking tickets/week as a bar graph, a second widget for displaying number of fines paid as a bar graph, a third widget for displaying the percentage of fines paid in each of the four preceding weeks, a using a pie chart, a forth widget for displaying an overall rating of the parking enforcement department, and a fifth widget for displaying data for each employee in a table.

Displayed data 130, 132, 134 in regions 74, 76, 78 of the webpage can be monitored by the alert component 88 to provide an alert when the data fails to meet one or more predefined rules, e.g., exceeds a predetermined threshold. For example, when a KPI threshold is met, an alert may be provided automatically to a designated user or alert system by the alert component 88. The alert can also be displayed or accessed through a widget on the webpage, as shown at 140 in FIG. 3.

Utilizing widgets 72 allows users to customize their separate management systems 96, while making collection and analysis of the data across the different users easier and less time-consuming.

Figure 2:
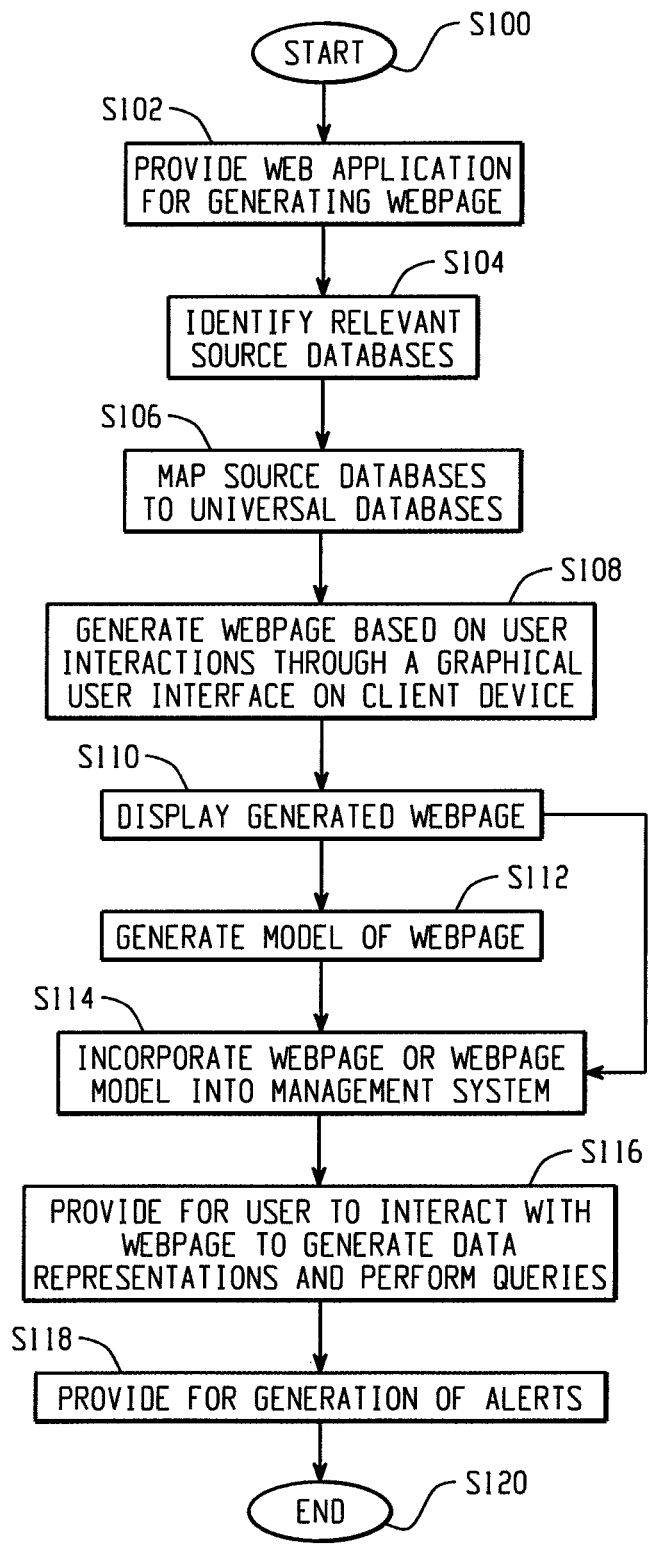
FIG. 2 is a flow diagram showing a method for customizing web applications within a domain, in accordance with another aspect of the exemplary embodiment.

With reference to FIG. 2, a computer-implemented method for customizing web applications within a domain, which may be performed in the networked system 10, is illustrated. The method begins at S100.

At S102, a client side webpage-generating web application 94 is provided on a client device 14. The web application 94 may be downloaded onto the client device by interactions with the host computer 12 or other web application provider.

At S104, optionally, one or more of the source databases 32, 34, 36, to which the organization has access is/are identified. This may be achieved by the user providing an access code which is validated by the host computer 12, or other suitable authorization protocol.

At S106, the identified source databases are mapped to a universal database 90 by the mapping component 80.

Figure 5:
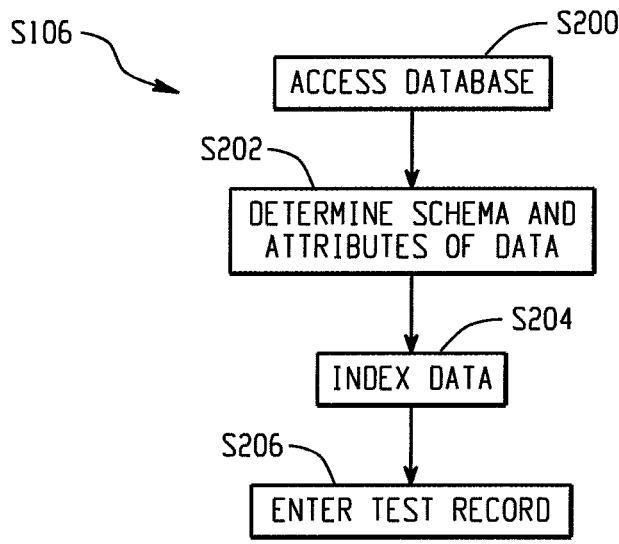
FIG. 5 is a flow diagram showing generating a universal database in the method of FIG. 2, in accordance with one aspect of the exemplary embodiment.

At S108, the page builder 82 provides for one or more webpages to be built by a user of an organization, using a GUI 64. Further details of this step are shown in FIG. 5.

At S110, the generated webpage is displayed on the GUI 64, by the page builder 82.

At S112, a model 124 of the webpage, once approved by the user, may be generated and stored in memory, by the page builder 82.

At S114, the webpage 68, or model 124 thereof, may be incorporated into a management system 96, by the page builder 82.

At S116, provision is made for the webpage 68 to be accessed by the same or another user of the organization, which may include one or more of: receiving a request for the webpage, accessing the webpage model 124, regenerating the webpage 68 from the model 124, providing for a user to actuate the displayed widgets 72 on the webpage, implementing the calls to the universal database 90, retrieving data from the universal database 90 and/or the linked source databases 32, 34, 36, optionally, manipulating the retrieved data as specified in the respective formula, and incorporating the data into the webpage, thereby causing the data to be displayed, e.g., graphically, in the webpage.

At S118, provision may be made for an alert to be generated when some of the displayed data does not meet one or more predefined rule(s) or another alert-triggering event is detected.

The method ends at S120.

As will be appreciated, the steps of the method need not proceed in the order described above and fewer, more or different steps may be included.

With reference to FIG. 5, the data mapping (S106) may include accessing the databases 32, 34 (S200), and identifying a schema of the data and determining attributes of the data (S202). The schema and attributes are used to generate an index of the data (S204), which includes text extracted from all records in each database and group index pointers from the index to the records to allow for key word and phrase searching capabilities. A test record may be entered for a user to teach the system how to conduct the search based on the request of the user (S206). The test record provides a way in which a particular user interacts with the management system interface and assists in the building of a query to prevent the user from having to learn how to build a most effective query.

Figure 6:
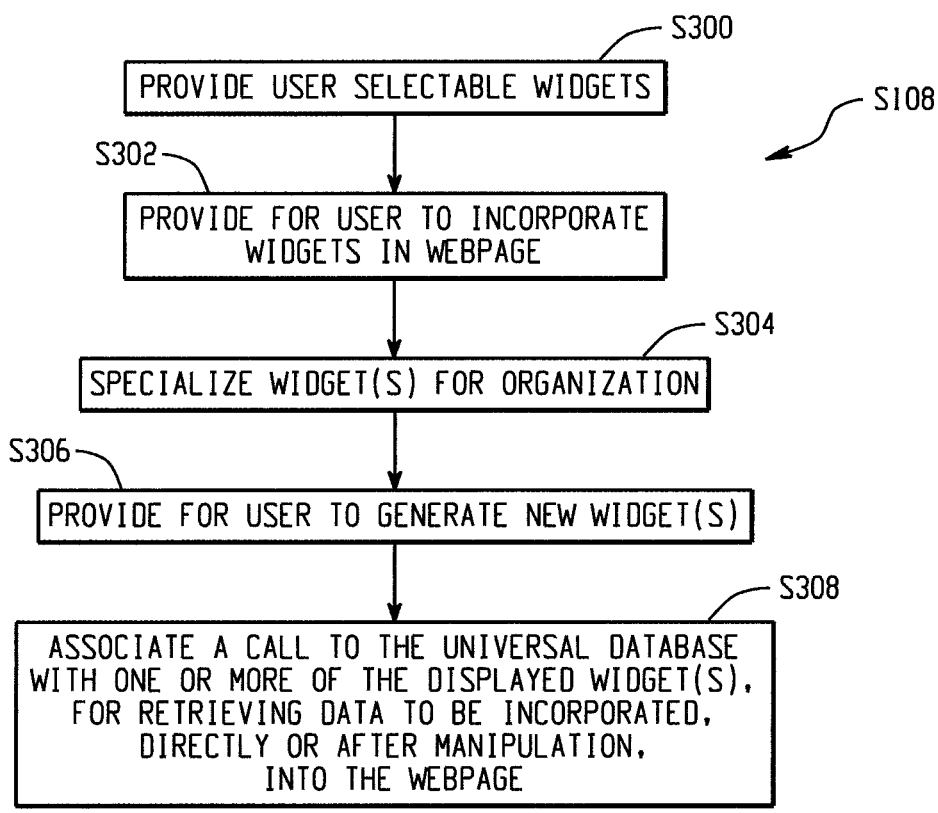
FIG. 6 is flow diagram showing generation of a webpage in the method of FIG. 2, in accordance with one aspect of the exemplary embodiment.

With reference to FIG. 6, the generation of the webpage (S108) may proceed as follows. At S300, provision is made for the user to select one or more widgets 72, for generating a webpage 68, via the web application 94. At S302, provision for the user incorporate one or more widgets into the webpage 68, e.g., by positioning the selected widgets on a webpage template 100. S304 may include providing for the user to specialize the selected widgets for the organization, or automatically providing for the specialization. Each widget may be identified and selected via a title 108 of the widget, which may be based on a generic business rule taxonomy and domain vocabulary that is particular to the industry or domain in which the organization performs business. The specialization may include converting the general vocabulary and business rule taxonomy to customer-specific equivalents thereof. Each of at least some of the widgets 72 is associated with a different type of data 130 to be presented in the webpage 68. The same widgets can be presented for reuse by another user associated with a different organization within a common business domain. The specialization of the vocabulary and business rule taxonomy for each widget to become user specific can be performed at a time concurrent with or subsequent to placement of the widgets. Also, if a desired widget is not provided, provision may be made for a new widget 114 to be generated by the user (S306).

As an example, a user of the Region A Police Department is converting their unique system to an independent system that is tied to independent systems of other police departments in the same state. The user may decide to generate a webpage for incoming calls, which provides data about all incoming calls received by the department, including attributes for date and time, call number, location from which the call was received, complaint type, and caller identification. The user opens the webpage template and is provided with a set of widgets which can be used in creating the webpage. During building of the webpage, the user can select one or more of these widgets for displaying attributes of the call data or calculations of the call data, such as key performance indicators. The widgets selected to display the incoming call data can be universally titled "call type 1" for the first widget, "call type 2" for the second widget, "call type 3" for the third widget, and "call type 4" for the fourth widget. The specialization can include changing the title for the first widget to "incoming call type," for the second widget to "call number," for the third widget to "break and entry calls," and for the fourth widget to "alarm calls."

The page builder application 82 may be offered to users on a subscription basis or on a flat sale basis.

Returning to FIG. 6, at S308, a call is built for each placed widget concurrent with or subsequent to the specialization to identify a location, in the universal database, of the data which is to be optionally manipulated, the location of the formula(s) to be used in the data manipulation, and which is to be displayed by the actuation of that widget. Thus, in the above police example, one or more calls to the universal database is/are generated for each of the four widget, for retrieving data. Each call may include identification of the relevant fields of the universal database which include the data from, or links to, the source database from which the data is obtained and, optionally, a user name and password for accessing the data from the utilized source database(s). In the police example, the data displayed by all four widgets are from a common data source regarding incoming call data. Therefore, the called data can be the same as or similar for each of the four widgets in the webpage. The method may return to S200 for the creation of a next webpage.

In one embodiment, two or more of the placed widgets can be linked to communicate with one another directly, without accessing a further data source. For example, the second widget may utilize the data displayed by the first widget to identify the number of daily calls by adding the values of all the call types represented in a pie chart via the first widget. Other types of communication between the widgets are possible.

Returning to FIG. 2, once the user is satisfied with the placement of the widgets, a model 124 of the webpage can be generated at S112 and stored. Current web applications that store HTML of the widgets directly can be limiting when the incorporation of new information, not available at the time the web application was built, is desired for display. To address this, the exemplary model 124 stores a representation of the webpage layout, including widgets and page level configurations, along with sources of data to be rendered.

Figure 7:
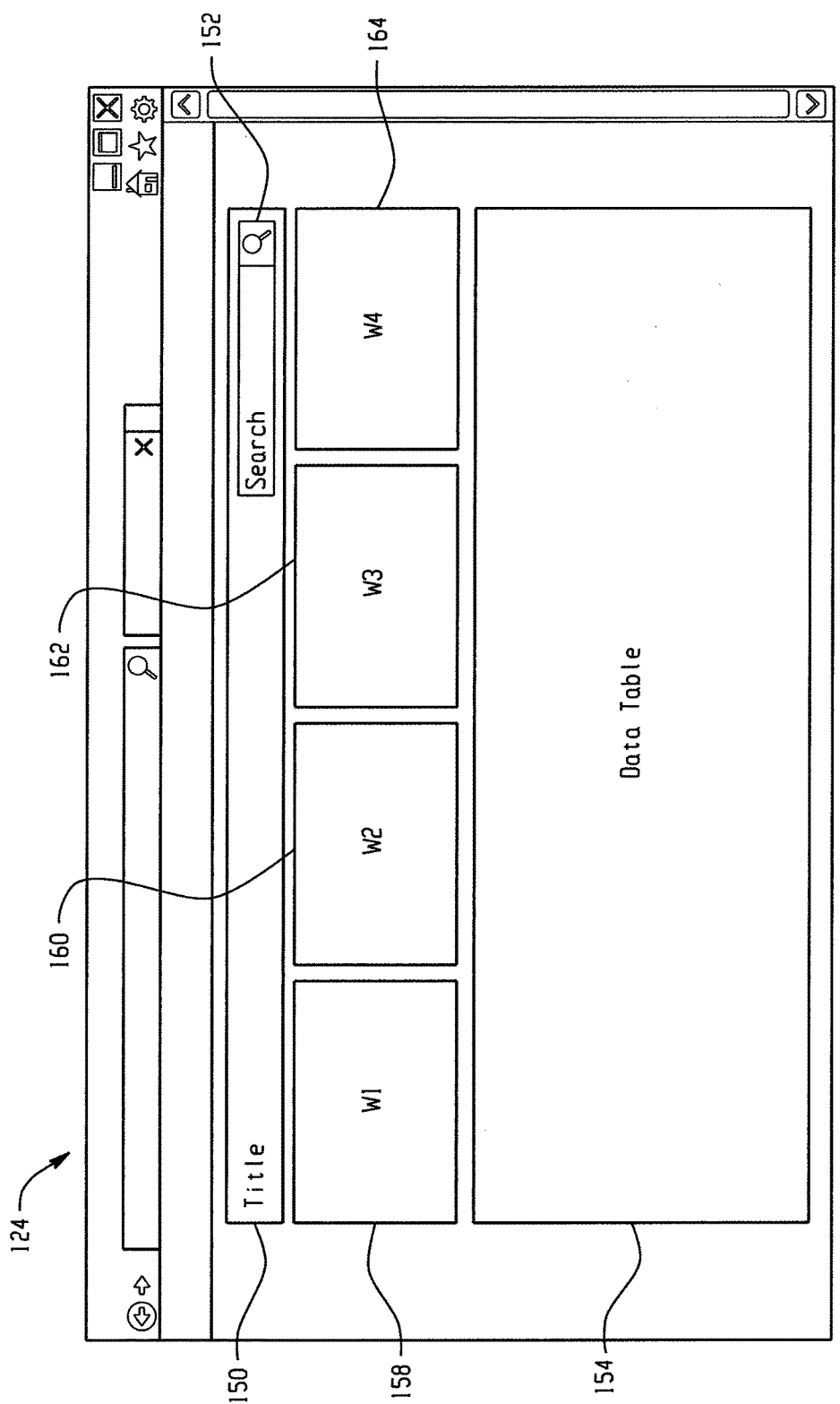
FIG. 7 illustrates a model of a webpage for generation of a webpage on request.

FIG. 7 is a block diagram showing an example model 124 of the webpage of FIG. 3. The model 124 includes representations 150, 152, 154, 156, 158, 160, 162, 164 for placement of the title, search field, data set, and widgets, respectively, to build the HTML for the page. In one embodiment, the HTML model 124 is stored in a database table with models for other webpages of the management web application. The database tables can be automatically built and populated, along with the routes necessary to connect any incoming request to the appropriate row in the database. Each model can be stored with specific information for routes connecting incoming page requests to a specific row in the database for that webpage or to rows in a table of calls used for that webpage. Further, unique identification keys can be utilized to reference each webpage stored in the database table.

In one embodiment, the models 124 can each be stored as .haml files (or other XHTML Abstraction Markup Language); however, other types of files are also contemplated. The universal database 90 can include a reference to a location of the webpage model 124, such as a file location, including a widget.json (JavaScript Object Notation) file.

Each widget.json file can include a label to reference the widget, dependency references, including external data sources, and a configuration schema for visualizing data provided by the external data sources. Upon receipt of a page request, a web server will build the HTML using the information from the appropriate row in the database for sending to the requester along with any other information identified for the requested webpage. Since the calls for data are made at run time, the most up-to-date data is included for display.

Alternatively, information for the webpage can be stored, even if a model is not generated. For example, a new row is input into a webpage database table for each webpage and a new row input to a widget database table for widget data calls. Instead of the data call being embedded in a widget via the widget.json file, as described above, widget JavaScript code calls an application programming interface at a web server, which calls an application programming interface specified by a page server that is running on the host computer (or a separate web server). For example, a widget for a visual analytic of a key performance indicator is able to access current data to display. To ensure that the current data is in a proper form, a browser client may execute JavaScript code that requests the relevant data for one or more widgets from the data server 38. The web application running on the web server interprets the request, determines that the data needs to be accessed from an internal or external source and initiates an appropriate call to a data source. The data is then returned to the browser client. This embodiment can be useful when at least one of the data sources does not allow queries from external computers, but only trusted systems, such as the web server.

In yet a further embodiment, a server-side web application framework, such as Ruby-on-Rails (see, github.com/rails/rails), can be used to build a web application 128 for the management system 96. The page builder uses custom Rails generators for metaprogramming controllers, models, views, and routes. Actions for any AJAX requests are included in the controller files and the page builder can identify any necessary AJAX requests since the requests will correspond to widget functionalities already defined, such as within the widgets or by linkages between the widgets. Other types of web applications can be built using other architectures. (AJAX is a set of Web development techniques using many Web technologies on the client side to create asynchronous Web applications. With Ajax, Web applications can send data to and retrieve from a server asynchronously (in the background) without interfering with the display and behavior of the existing page. By decoupling the data interchange layer from the presentation layer, Ajax allows for webpages, and by extension Web applications, to change content dynamically without the need to reload the entire page. In practice, modern implementations commonly substitute JavaScript Object Notation (JSON) for XML due to the advantages of being native to JavaScript.)

Figure 8:
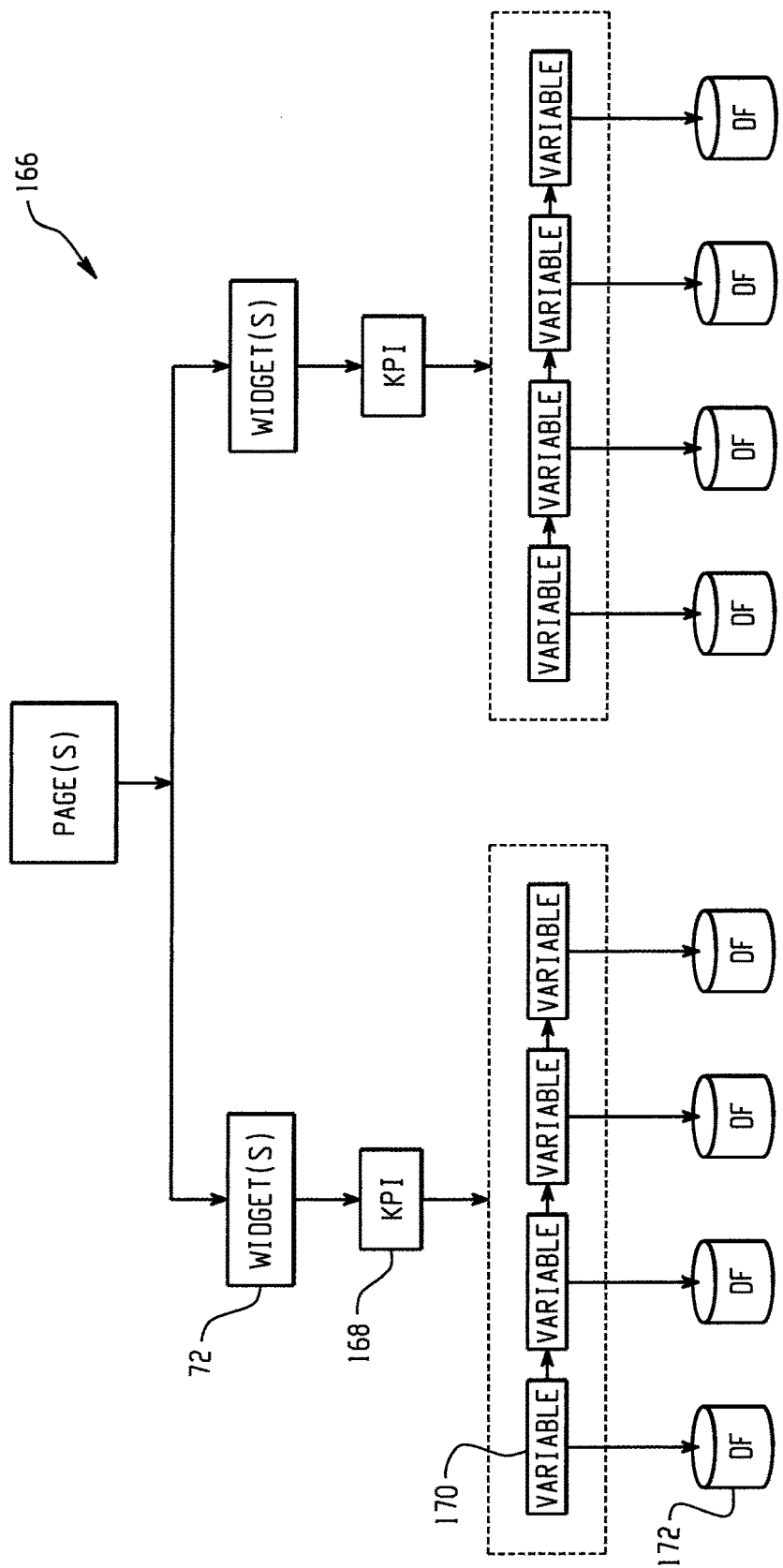
FIG. 8 is block diagram showing elements of a page built by the page builder of FIG. 1.

FIG. 8 illustrates an example of a configuration schema 166 for web pages. Each page includes one or more widgets 72, each associated with a respective KPI 168. Each KPI is associated with one, two, or more variables 170, which each refer to a respective data field 172 of the universal database 90.

Once all the webpages for the management system 96 are stored and compiled as a web application 128 (S114), other users may be allowed to access and utilize the management system 96. User access can include requesting one of the webpages for data entry or review, conducting a search for data, and receiving notifications.

Figure 9:
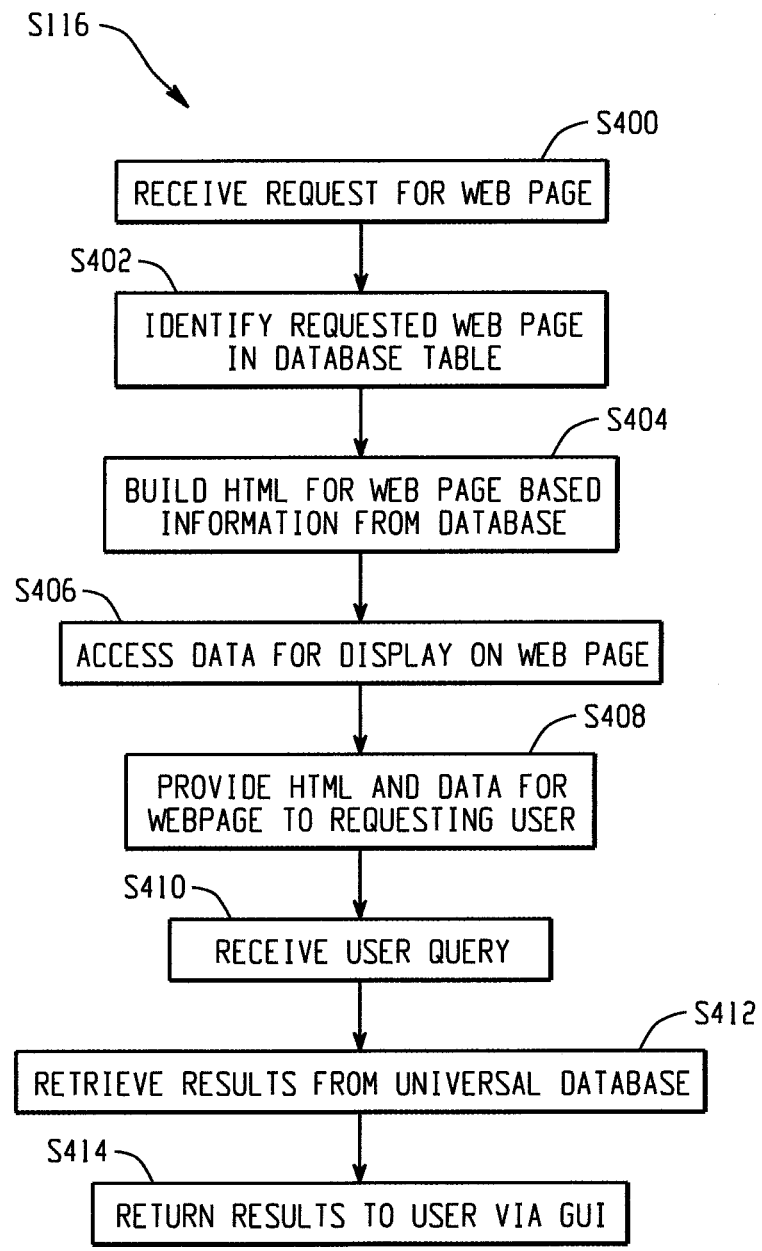
FIG. 9 is a flow chart illustrating regeneration of the webpage and querying the universal database in the method of FIG. 2.

FIG. 9 is a flow diagram showing, by way of example, the process (S116) for accessing a webpage. The management system 96 is monitored to identify requests to access a particular page by an authorized user, including individuals associated with an organization that owns and/or created the management system 96 (S400). At S402, information for the requested page is identified in a database table, such as via a unique identification code. The information can include a model 124 for building HTML of the webpage, a reference to a location of the model, or the HTML itself. At S404, the webpage 68 is built, during run time, using the HTML. At S406, data to be displayed via the webpage can be accessed via data calls, which may also be stored in the same universal database table or in a different database table. In some embodiments, the requested data from the source databases is brought into the universal database at run time, allowing for the data used to be the most current data available. Once the webpage has been compiled, the page 68 can be provided, at S408, to the requesting user.

Once user access has been granted to the management system 96, a user can also conduct a search for information, using the client side of the web application 94. At any time, a query can be received (S410), by the querying component 84, from a user for querying the universal database. At S412, results for the query are obtained, by the querying component, via the index of the universal database 90. At S414 the results are sent to the requesting user, e.g., via the GUI 64.

In addition, to providing information that satisfies the request, related information can also be provided. As an example, a user may initiate a search for data related to "Tom Connery." A query can be performed, within the police management system, and all incoming calls received by or violations committed by Tom Connery are identified. Additionally, since the search index provides pointers to other data records, other individuals associated with Tom Connery, such as accomplices, can also be identified.

The provision of alerts to a user (S118) may include establishing one or more predefined thresholds and applying it/them to at least one performance metric determined from a data source. Data values associated with each performance metric are compared with the corresponding threshold. If the data value exceeds the threshold, an alert is provided to the user. If, on the other hand, the data value for the metric does not exceed the threshold, a next performance metric (if any remain to be checked) is selected for comparison with a respective threshold.

As an example, in a call center, a threshold can be set for a number of incoming calls that are on hold, to identify when another responder should be hired to help answer the calls. When the number of incoming calls exceeds the threshold, an alert, such as a text message, email, phone call or other notification can be send to predetermined recipients, such as a manager of the call center answering the calls. In one embodiment, the alert requirements, including the threshold, are embedded in a particular widget that provides a visualization for the measured performance metric.

Figure 10:
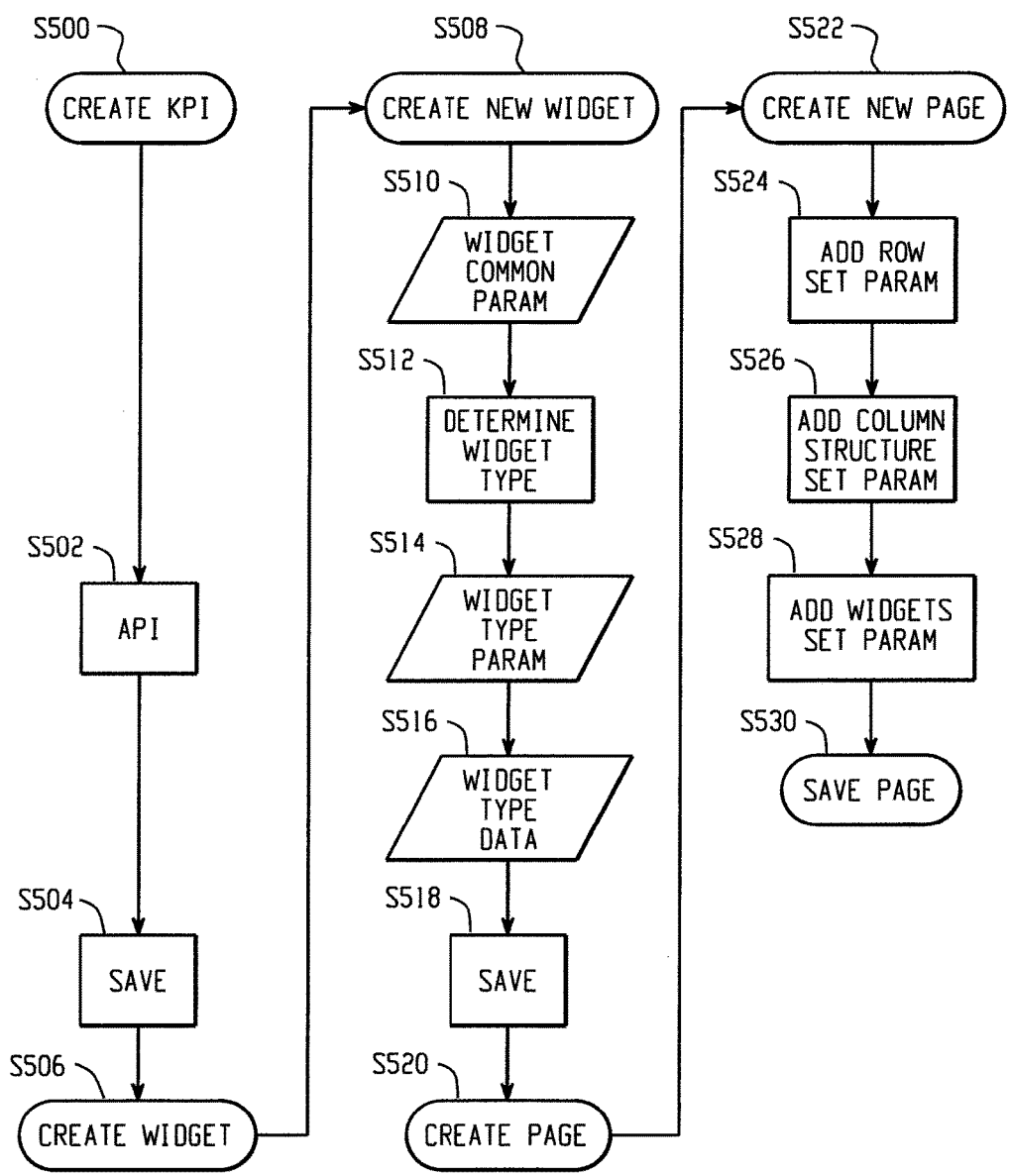
FIG. 10 is a flow chart illustrating indexing and searching of the universal database in the method of FIGS. 2 and 5.

With reference to FIG. 10, the creation of widgets in accordance with one embodiment may include creating a KPI (S500), establishing an API for the KPI (S502), saving the KPI (S504), creating a widget for the KPI (S506), creating a new widget (S508), establishing parameters for the widget (S510), determining the widget type, saving the information to the widget file (S518), and creating a new webpage (S520). A new row for the page may be created for the database (S522), with a set of parameters for the row (S524), columns (S526), and widgets (S528), and the indexed page data saved to the database (S530).

The web application for generating a management system can also be used for customizing e-discovery systems to manage the discovery process, call centers to manage customer requests, retail services to manage inventory, and other types of services provided.

The exemplary system and method enables a user to create widgets for visualization of output data which is the result of manipulation of two or more different pieces of input data derived from two or more different source databases, e.g., which is input to a formula to generate the output data.

The host computer 12 and client computer(s) 14 may each include one or more of a PC, such as a desktop, a laptop, palmtop computer, portable digital assistant (PDA), server computer, cellular telephone, tablet computer, pager, combination thereof, or other computing device capable of executing instructions for performing the exemplary method.

The memory 20, 40 may each represent any type of non-transitory computer readable medium such as random access memory (RAM), read only memory (ROM), magnetic disk or tape, optical disk, flash memory, or holographic memory. In one embodiment, the memory 20, 40 comprises a combination of random access memory and read only memory. The I/O interfaces may each comprise a modulator/demodulator (MODEM) a router, a cable, and and/or Ethernet port.

The digital processors 24, 44 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The method illustrated in one or more of FIGS. 2, 5, 6, 9, and 10 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2, 5, 6, 9, and 10 can be used to implement the method. As will be appreciated, while the steps of the method may all be computer implemented, in some embodiments one or more of the steps may be at least partially performed manually.

Figure 11B:
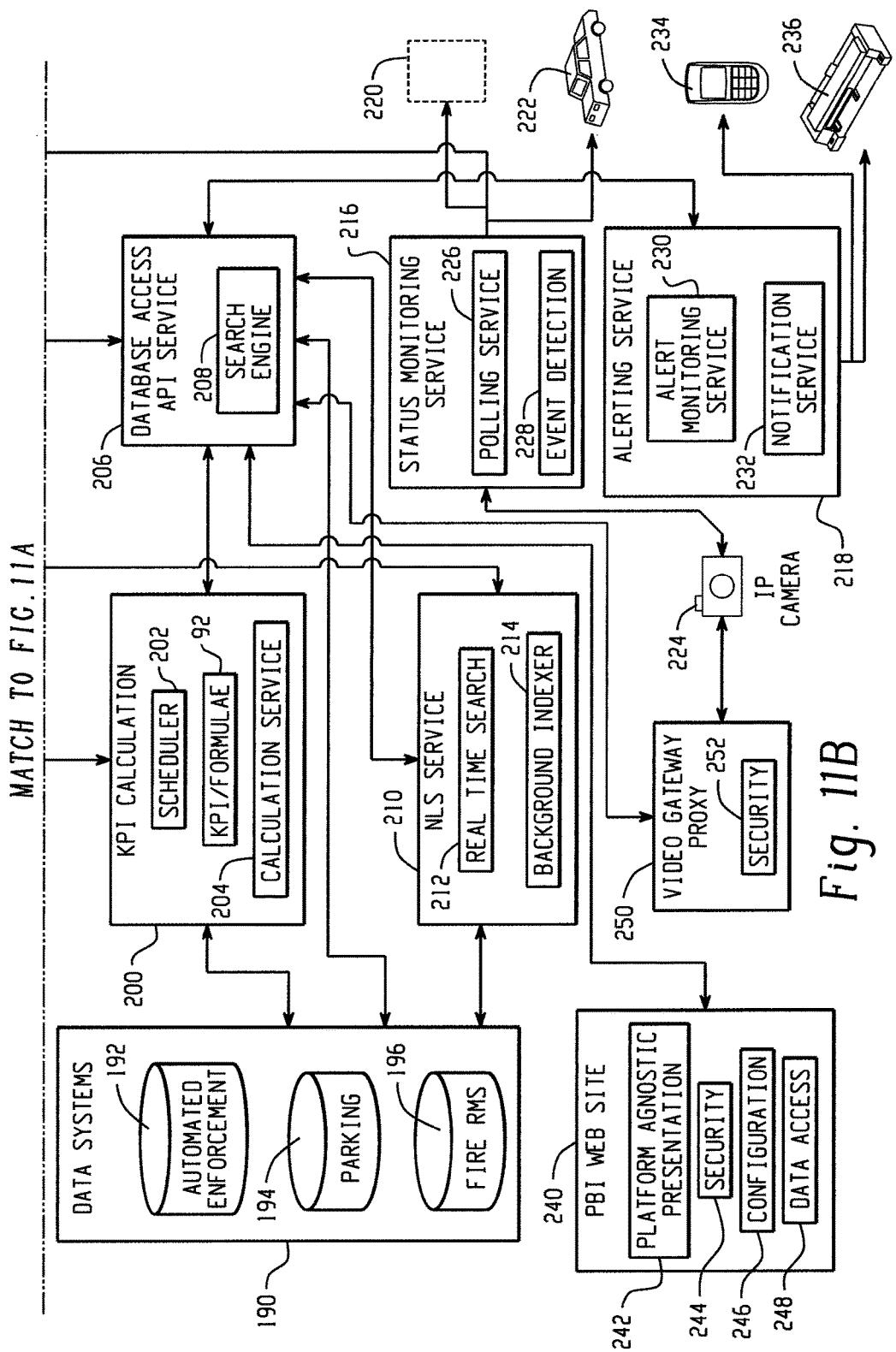
FIG. 11, which is split into FIGS. 11A and 11B for ease of illustration, is a block diagram showing components of the system of FIG. 1 adapted to a police call center application.

FIG. 11 (split into FIGS. 11A and 11B) illustrates a specific example of the system of FIG. 1, showing services performing some of the functions of the system 10 in the case of a police department. The database mapping component 80 (of FIG. 1) includes or calls on a set of data extraction/transformation layer services 176 to access the user's data sources 32, 34 and map them to fields in records of the universal database 90. The services 176 includes an API Windows and web services component 176, which is a logical component which makes the decision as how to connect to each source database and performs the extraction. The services component 176 may incorporate or access a variety of services, such as a health monitor service (HMS), an extractor, a transcoder, a transfer service, a deployer, and remote diagnostics. The HMS monitors the health of the other services, to determine whether they are performing their respective functions. The extractor pulls the data out of the structured databases. The transcoder extracts data from the unstructured databases and converts it from an input format to a standardized output format so that it can be managed and utilized. For example different source video formats may be converted to a common video format. The transfer service sends the data to the universal database. The deployer monitors and checks for updates to any of the services 176 and automatically updates the services when updates are found. The remote diagnostics component maintains the health and welfare of all the services 176. One example service is a transaction log reader service 178, which can be used as both a tool for determining how to access the database and, if the database is one which incorporates transaction logs, to read the logs to extract the data from the transaction logs.

The universal database, in this embodiment, is stored on a database platform 182, together with stored procedures 184 and views 186. The views 186 allow the system to modify, store and retrieve aggregated data.

Data systems 190 store additional information which may be used by the system, such as automated enforcement information 192, parking information 194, and a fire records management system 196. This information may come from ancillary systems that are accessible to the present system.

The data manipulation component 86 (FIG. 1) includes or calls on a KPI calculation component 200, which in addition to KPI formulae 92, includes a scheduler 202 and a calculation service 204. The calculation service 204 performs the calculation of the KPI formulae 92 on the retrieved data. The scheduler 202, periodically and/or upon request, calls a Database access API service 206 for retrieving the data used in the KPI calculations from the universal database 90 (or in some cases, may access the database 90 directly). The API service 206 exposes the universal database 90 in a standardized format for ease of access, searching, and retrieval. The API service 206 includes a search engine 208 which can be queried with different types of query, such as a direct single or multiple records indexing request (e.g., for JSON files) or a batch index request. The API service may also perform the indexing of the universal database (S204). For this, the API service 206 may be loaded with index configuration settings which identify the tables and fields of the universal database, the source databases and their respective schema and owners, and the like. The data to be indexed from the source databases is uploaded to the API service which produces an indexed document repository containing the uploaded documents.

The querying component 84 (FIG. 1) may include or call on a natural language search (NLS) component 210, which indexes the data that has been aggregated into the universal database 90, for ease of access by a search engine. The NLS component 210 includes a real time search component 212 and a background indexing component 214. The real time search component 212 allows searching of the most up-to date data from the data sources. The background indexing component 214 allows the system to search and retrieve aggregated data based upon freeform key words.

The alert component 88 (FIG. 1) may include or access a status monitoring service 216 and/or an alerting service 218. The status monitoring service 216 monitors the status of external physical devices that provide information on one or more activities which may trigger an alert and/or are used in computing a KPI. The illustrated status monitoring service 216 has access to external data from one or more Simple Network Management Protocol (SNMP)-compliant device(s) 220, GPS devices 222, e.g., associated with vehicles responding to emergency calls, and fixed or portable surveillance cameras 224, which provide image data, e.g., still photographic images and/or videos. The status monitoring service 216 includes a polling service 226 and an event detection component 228. The polling service 226, periodically or on request, polls the external data sources and receives data from them. The event detection component 228 determines when an alert triggering event has occurred, based on one or more of the KPI calculations, data in the universal database, and polled external data acquired by the polling service.

The alerting service 218 includes an alert monitoring service 230 and a notification service 232. The alert monitoring service 230 monitors the alert triggering events output by the event detection component 228. The notification service 232 outputs an alert to one or more external devices, such as the client device 14, a smartphone 234, e.g., operated by a responder, a printer or fax machine 236, or the like.

The client device receives the widget data, the alerts, and responses to queries, etc. through a Police Business Intelligence (PBI) website 240, which may be hosted by the host computer 12 or a separate computing device. The illustrated website 240 includes components for platform agnostic presentation of the data acquired from external devices 242, security 244, data configuration 246, and data access 248, which ensure that the client device can seamless receive and present the widget data, alerts, query responses, etc., to which the user is authorized to receive, without the need for reconfiguring the data on the client device. A video gateway proxy server 250 includes additional security 252 before authorizing user access to the external image/video data from camera(s) 224. For example, a user may define a widget 72 for streaming video from one or more of the video cameras. This allows multiple users to have access to the video stream through the webpage.

As one example use of the system of FIGS. 1 and/or 10, an entity, such as a state police organization, may wish to share data with police departments for different towns in the state. Each of these related organizations may have its own management system for managing its internal data. The management system for Police Department A may store webpages for accessing offender information, violations, media collections, including video and audio data collected from police interactions, and training, as well as other metrics. The management system for a neighboring Police Department B may track similar data, but the methods which Department B uses to track offender violations and output the results differs from Department A. Thus, when the state requests data from each police department to determine offender violation statistics for the state, analysis of the data from each system, which would may normally involve manual entry of the data into a common system before analysis can occur, can be automatically generated. In the present system and method, each of the police departments in the state is able to employ an independent management system 96 that feeds data to a universal database accessible by the state, allowing data to be collected and analyzed efficiently. Alerts are also provided. For example, when the data represents performance metrics for traffic stops and the number of traffic stops by an individual police officer exceeds 10 stops in one day, a notification can be sent to a supervisor or manager of the police officer, which may identify a need for further assistance by another police officer.

In another illustrative example, one source database may include records of police investigations of criminal activity, including identifiers/names of the officers involved in the investigations, the charge(s) made, and whether the investigation resulted in a conviction, while another database may include, for each officer, the training classes that officer has undergone. The user may wish to evaluate whether officer attendance of DUI training classes impacts convictions for DUI offenses, e.g., through a graphical representation which shows average number of convictions before and after training. Since the data from these different databases is aggregated through the universal database, the user can easily generate widgets which cause this type of information to be computed from current data at any time, when the widget is actuated. Actuation of the widget causes the universal database to be queried, retrieving the relevant data (which was originally stored in the source databases) from the universal database to compute the metric.

In another illustrative example, a user may wish to show response time for emergency calls for a selected group of responders, in the form of a bar graph. The user may select or define a KPI named "response time" in terms of the computations to be made/formulae to be used. As an example, the computation may include computing the difference between the time the emergency call was placed and the time the reported time that the response team arrived (e.g., detected using a GPS device 222). The formula may average the response time for a single officer, a group of officers, over a selected period of time, such as a day, week, month etc. The user drags a bar graph widget into the webpage template and associates it with the KPI response time. When actuated, the widget displays the data as a bar graph. A basic KPI formula for the computation may be predefined, with the user being allowed to essentially filter the data, e.g., selecting the group of officers and/or time over which the data is to be averaged.

The system and method are useful in a wide variety applications in which data from multiple different sources can be integrated into a webpage. Examples include traffic enforcement, management of parking systems, healthcare, border protection, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for customizing web applications within a domain, comprising:
    mapping a plurality of source databases to a universal database;
    generating a webpage, including:
        providing a webpage-generating web application on a client device for a user of the client device to select and incorporate at least one widget into a webpage, built by the user, for defining content of the webpage which is displayed on a graphical user interface associated with the client device,
        associating a call to the universal database for the incorporated at least one widget, such that when the widget is actuated, a visualization of data from at least one of the plurality of source databases that has been mapped to the universal database is incorporated into the webpage; and
    after the webpage has been built by the user, incorporating the webpage or a model thereof into a management system,
    wherein at least one of the mapping, associating, and incorporating is performed with a processor.

2. The method of claim 1, wherein the plurality of source databases includes a plurality of structured databases and optionally one or more unstructured databases.

3. The method of claim 2, wherein the mapping includes mapping fields of each of the plurality of structured source databases to respective fields of the universal database.

4. The method of claim 1, wherein the mapping of the plurality of source databases to a universal database comprises generating an index of the universal database, the index comprises a pointer to a record from which each data entry was obtained.

5. The method of claim 1, wherein the at least one widget comprises a widget configuration file which causes a widget graphical representation to be displayed on a user interface.

6. The method of claim 5, wherein the displayed widgets are of a plurality of different types, each type of widget providing for a different type of graphical representation of the incorporated data to displayed.

7. The method of claim 1, wherein the providing for the user to incorporate at least one widget into a webpage comprises:
    displaying a plurality of widget graphical representations on the user interface; and
    providing for the user to position at least one of the displayed widget graphical representations in a webpage template.

8. The method of claim 7, further comprising providing for the user to specialize at least one of the displayed widgets.

9. The method of claim 8, wherein the specializing includes at least one of:
    providing for the user to filter data to be used in computing a performance metric; and providing for the user to define a formula which is computed using data derived from at least two of the source databases.

10. The method of claim 1, wherein at least some of the widgets are each associated with a general title, the method further comprising specializing the widget by the replacing the general title of the widget in the webpage with a title specific to the webpage.

11. The method of claim 1, further comprising providing for a user to actuate the incorporated at least one widget in the webpage, and incorporating called data from at least one of the plurality of source databases that has been mapped to the universal database into the webpage.

12. The method of claim 11, wherein the incorporating of the called data comprises generating a graphical representation based on the called data.

13. The method of claim 11, wherein the incorporating of the called data comprises manipulating the data prior to incorporating the data into the webpage.

14. The method of claim 13, wherein the data manipulation comprises inputting the called data into a formula.

15. The method of claim 14, wherein the manipulated data is derived from at least two of the source databases.

16. The method of claim 1, further comprising:
applying a threshold to at least one performance metric computed on the data incorporated in response to actuation of at least one of the widgets; and
sending an alert to a user when the at least one performance metric exceeds the threshold.

17. The method of claim 1, further comprising:
receiving a user query for data via the webpage; and
accessing an index of the universal database to obtain the data identified in the query.

18. The method of claim 1, further comprising:
limiting access to data from at least one of the source databases mapped to the universal database based on a user's authorization to access the at least one source database.

19. The method of claim 1, further comprising providing for a first of the widgets incorporated in the webpage to communicate with a second of the widgets incorporated in the webpage to utilize data displayed by the second widget.

20. A computer program product comprising a non-transitory recording medium storing instructions, which when executed on a computer, cause the computer to perform the method of claim 1.

21. A system for customizing web applications within a domain, comprising:
a universal database to which each of a plurality of source databases is mapped;
a page builder which generates a webpage, the page builder providing a graphical user interface which displays a set of user-selectable widgets for a user to incorporate at least one of the displayed widgets into a template for the webpage, and for associating a call to the universal database for retrieving data corresponding to the incorporated at least one widget;
a data manipulation component which, for at least one of the actuated widgets, manipulates the retrieved data for incorporation into the webpage; and
a processor which implements the page builder and data manipulation component.

22. A computer-implemented method for customizing web applications within a domain, comprising:
generating a webpage, including:
providing for a user to select at least one widget from a displayed set of widgets and incorporate the selected at least one widget into a webpage template to generate the webpage, and
for the incorporated at least one widget, associating a call to a universal database to which a plurality of source databases are mapped, and
incorporating the webpage or a model thereof into a management system;
providing for the widget to be actuated; and
when the widget is actuated, making the call to the universal database and incorporating data from at least one of the plurality of source databases that has been mapped to the universal database into the webpage,
wherein at least one of the mapping, associating, and incorporating is performed with a processor.

* * * * *